United States Patent [19]

Nelson et al.

[11] Patent Number: 4,969,175
[45] Date of Patent: Nov. 6, 1990

[54] APPARATUS FOR NARROW BANDWIDTH AND MULTIPLE ENERGY X-RAY IMAGING

[76] Inventors: Robert S. Nelson, 25511 El Conejo La., Laguna Hills, Calif. 92653; Zoran L. Barbaric, 3649 Surfwood Rd., Malibu, Calif. 90265; Reuven D. Zach, 27572 Santa Clarita Rd., Saugus, Calif. 91350

[21] Appl. No.: 352,685
[22] Filed: May 10, 1989

Related U.S. Application Data

[63] Continuation of Ser. No. 897,009, Aug. 15, 1986, abandoned.
[51] Int. Cl.$^5$ .............................................. H05G 1/64
[52] U.S. Cl. ..................................... 378/146; 378/82; 378/84; 378/99
[58] Field of Search .................................. 378/82–85, 378/146, 5, 99; 358/111

[56] References Cited

U.S. PATENT DOCUMENTS

| | | | |
|---|---|---|---|
| 4,045,672 | 4/1977 | Watanabe | 250/360 |
| 4,203,037 | 5/1980 | Gur et al. | 250/505 |
| 4,238,529 | 12/1980 | Sicignano et al. | 378/84 |
| 4,261,771 | 4/1981 | Dingle et al. | 378/84 |
| 4,366,574 | 12/1982 | Hill | 378/99 |
| 4,625,323 | 11/1986 | Okaya | 378/5 |
| 4,675,889 | 6/1987 | Wood et al. | 378/84 |
| 4,693,933 | 9/1987 | Keem et al. | 378/84 |
| 4,736,398 | 4/1988 | Graeff et al. | 378/84 |
| 4,737,973 | 4/1988 | Ogawa et al. | 378/84 |
| 4,785,470 | 11/1988 | Wood et al. | 378/84 |

FOREIGN PATENT DOCUMENTS

| | | | |
|---|---|---|---|
| 60-49231 | 3/1985 | Japan . | |
| 0920480 | 4/1982 | U.S.S.R. | 378/84 |

OTHER PUBLICATIONS

J. H. Underwood, *Layered Synthetic Microstructures as Bragg Diffractors for X-Rays and Extreme Ultraviolet: Theory And Predicted Performance*, Applied Optics, vol. 20, No. 17 (Sep. 1981).
J. Underwood et al., *The Renaissance of X-Ray Optics*, Physics Today, vol. 37, No. 4, pp. 44–52 (Apr. 1984).
E. Spiller, *Evaporated Multilayer Dispersion Elements for Soft X-Rays*, A.I.P. Conference Proceedings, No. 75, pp. 124–130 (1981).
A. E. Rosenbluth et al., *The Reflecting Properties of Soft X-Ray Multilayers*, A.I.P. Conference Proceedings, No. 75, pp. 280–285 (1981).
D. J. Nagel et al., *Bragg Diffractors With Graded-Thickness Multilayers*, Nuclear Instruments and Methods, vol. 195, pp. 63–65 (1982).
J. DuMond et al., *An X-Ray Method of Determining Rates of Diffusion in the Solid State*, Journal of Applied Physics, vol. 11, pp. 357–365 (May 1940).
H. D. Zeman et al., *Implementation of Digital Subtraction Angiography with a Synchrotron X-Ray Beam*, I.E.-.E.E. Transactions on Nuclear Science, vol. NS-29, No. 1 (Feb. 1982).
D. H. Bilderback et al., *Design of Doubly Focusing, Tunable (5–30KeV), Wide Bandpass Optics Made From Layered Synthetic Microstructures*, Nuclear Instruments and Methods, vol. 208, pp. 251–261 (1983).
E. Spiller, A. Segmuller, J. Rife, R. Haelbich, "Controlled Fabrication of Multilayer Soft X-ray Mirrors, " App. Phys. Lett., 37 (11): 1048 (1980).
A. Vinogradov and B. Zeldovich, "X-ray and UV Multilayer Mirrors: Principles and Possibilities," App. Optics, vol. 16(1): 89 (1977).
Barnes et al., Med. Phys., 6(3): 197 (1979).
King et al., Med. Phys., 10(1): 4 (1983).
Rudin et al., Med. Phys., 9(3): 385 (1982).
Macovski et al., Comput. Bio. Med., 6: 325 (1976).
Lehmann et al., SPIE, vol. 314: 143 (1981).
Lehmann et al., Med. Phys., 8(51): 659 (1981).
A. Thelen, Multilayer Filters With Wide Transmittance Bands, JOSA, vol. 53, No. 11, 1266–1270 (1963).

*Primary Examiner*—Carolyn E. Fields
*Assistant Examiner*—David P. Porta
*Attorney, Agent, or Firm*—Lyon & Lyon

[57] ABSTRACT

A multilayer x-ray reflector or reflectors are used with a source of radiation for narrow bandwidth or dual energy radiographic imaging applications. In one aspect, a unique multilayer design permits two distinct x-ray energies of narrow bandwidth to be reflected at the same incident angle for use in dual energy applications. In another aspect, several multilayer reflectors are employed in a slit scanning system. In yet another aspect, an elongated radiation source and a multilayer x-ray reflecting structure are combined to provide an x-ray or gamma ray source.

3 Claims, 9 Drawing Sheets

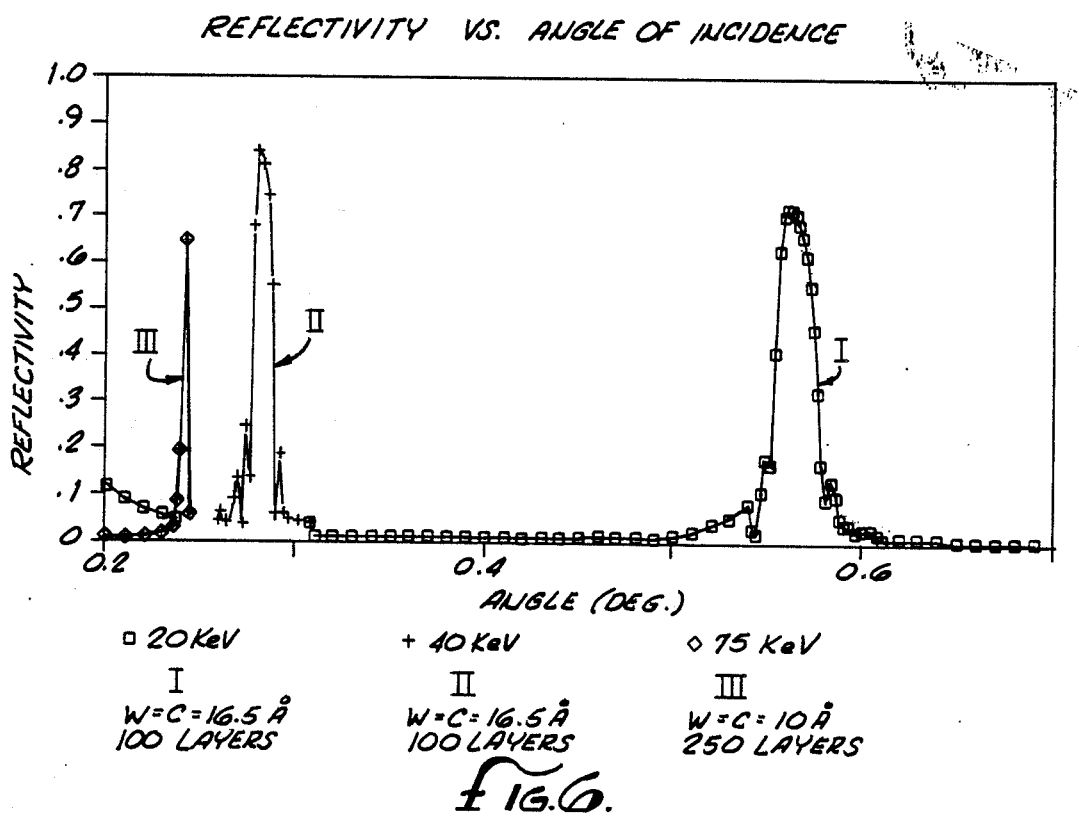
Fig. 6.
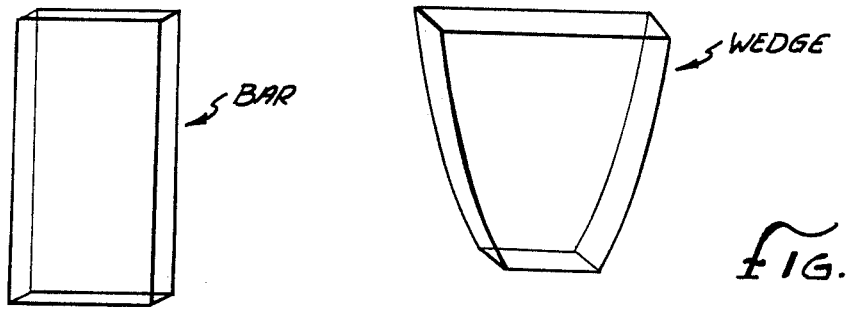
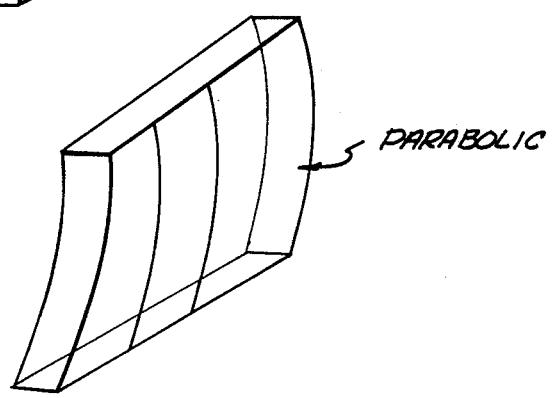
Fig. 7.

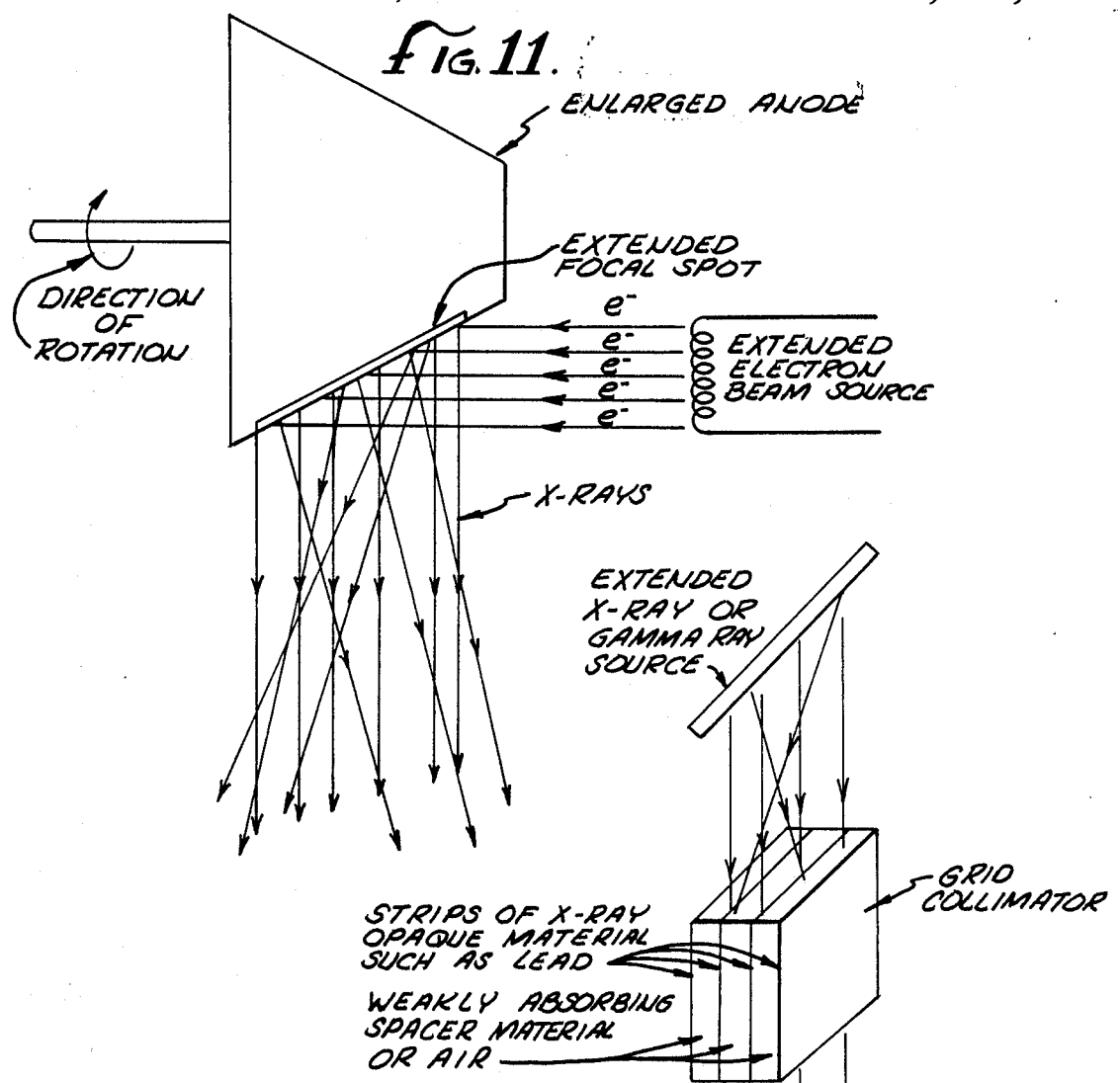
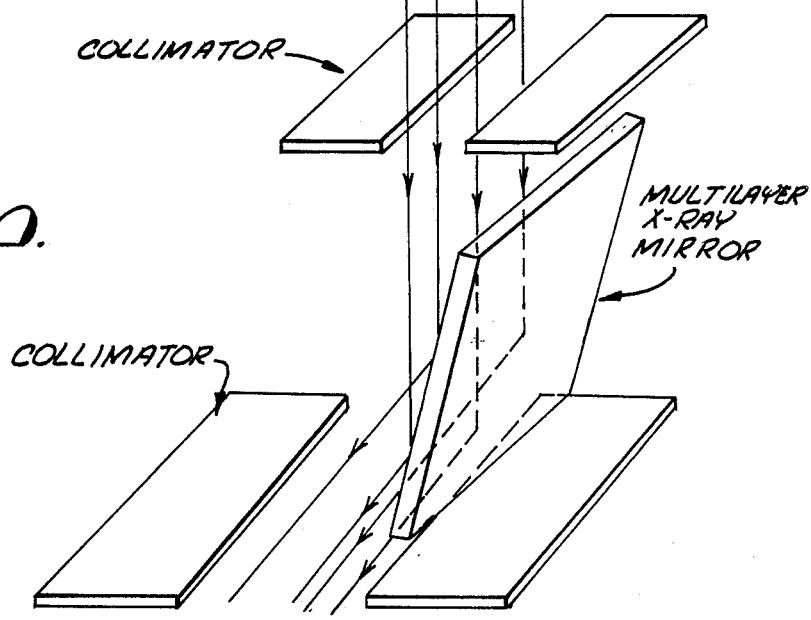

APPARATUS FOR NARROW BANDWIDTH AND MULTIPLE ENERGY X-RAY IMAGING

This is a continuation of co-pending application Ser. No. 897,009 filed on Aug. 15, 1986, now abandoned.

BACKGROUND

The field of the present invention is an apparatus for radiographic image acquisition and material composition analysis, and more particularly, apparatus employing x-ray reflective structures for narrow bandwidth and multiple energy x-ray imaging.

In recent years substantial efforts have been directed toward the development of x-ray optics for XUV and soft x-ray imaging applications such as x-ray microscopes, telescopes, and the imaging of hot plasmas (Underwood, J. Attwood D, *Physics Today*, p. 44, April, 1984). Due to such efforts, a certain amount of attention has been given to multi-layer mirrors. For example, multi-layer mirror structures have been considered as an alternative to conventional grazing incidence metal mirrors. A comparison between metal and multilayer mirrors shows that the multilayer offers several advantages:

(1) The x-ray angle of incidence can be increased beyond the critical angle.

(2) The multilayer is capable of rejecting (exhibiting low reflectivity) energies outside the narrow bandwidth reflectivity peak.

(3) The thickness of individual layers in a multilayer structure can be varied as well as the materials comprising the layers. For a given angle of incidence $\theta$, the reflectivity bandwidth can be altered.

(4) Multilayers can be deposited using vapor, sputtering, laser, molecular beam epitaxy or other deposition techniques on fabricated substrates of various geometric shapes.

Multilayer structures have also been used as wideband monochromators, replacing very narrow bandwidth Bragg x-ray crystals such as silicon. It may be convenient to speak of a multilayer structure as a synthetic x-ray crystal. As early as 1940, DuMond and Yountz (*J. Applied Physics* 11: 357, 1940) reported on a vapor deposited multilayer structure comprised of alternating gold and copper layers with a 100 Å (angstrom) period. Since the latter part of the 1970's, it has been possible to form quality multilayer structures with small (less than 10–20 Å) layer thicknesses using a variety of materials (e.g. W, ReW, Au Hf, Pt, Ta, Fe, Mo, Be, B, C, Si) and deposition techniques. Typically, multilayers are deposited on carefully polished substrates (silicon, float glass, mica, etc.) or diamond turned metal substrates since the roughness of individual layers tends to emulate that of the substrates surface.

While numerous patents have been issued on methods of preparing multilayer structures, they are largely directed to materials which are useful for electro-optic applications (e.g. Dingle et al., U.S. Pat. No. 4,261,771). Specific multilayer designs which could be of value for x-ray imaging at radiographic energies between 10–100 KeV are not emphasized. For x-ray energies common to medical radiography (10–100 KeV), the ability to deposit a high (H) atomic number material (H=W, ReW, Au, Hf, Pt, Ta, Mo, Fe, etc.) and a low (L) atomic number material (L= B, Be, C, Si, etc.) as alternating layers of adjustable thickness permits the design of a multilayer structure which offers high peak reflectivity and a much larger bandwidth than a Bragg x-ray crystal material such as silicon. Depending on the reflected energy and multilayer design, the bandwidth may be larger by a factor of several hundreds to several thousands. For matters of discussion, let H, L refer to the layer thicknesses of high and low atomic number materials, respectively, which make up a multilayer structure. The simplest multilayer designs range from Bragglike (H<<L) to quarter wave stack (H=L) (Spiller, AIP Proceedings No. 75: 124, 1981). The position of the primary reflectivity peak (m=1) can be crudely calculated using the Bragg equation ($m\lambda = 2d \sin \theta$, m=1, 2, 3, . . . is the order, $\lambda$=wavelength, d=H+L= the period, and $\theta$ the angle of incidence measured from the surface). The layer pair ratio H/L influences the intensity of the higher order reflectivity peaks. A sinusoidal variation in the thickness H and L has been suggested as a means of minimizing reflectivity for orders m>1 (Bilderback, *Nucl. Instr. Methods* Vol. 208: 251, 1983). A multilayer based on a graded layer thickness design has been employed as a means of increasing mirror collection efficiency for a diverging source (Nagel, *Nucl. Instr. Methods* Vo. 195: 63, 1982).

In the field of medical radiography, Imaging and tissue composition analysis problems encountered using x-ray spectra available with W-anode (and in some cases Mo-anode) x-ray tubes are severe. The wide bandwidth bremsstrahlung x-ray spectrum (W-anode) used in many radiological examinations imposes undesirable limitations on the information content of the recorded image. The effect of passing the x-ray beam through the patient is to harden the beam and so reduce image contrast. In many instances the radiologist compensates for this loss of image contrast or material composition information by increasing the image x-ray statistics and/or the invasiveness of the procedure. Additional restrictions on attainable image contrast are imposed by the dynamic range and energy resolution capabilities of the x-ray receptor. Various approaches which have been employed to minimize the spectral bandwidth problem include:

(1) Using the characteristic emission spectrum from a dedicated molybdenum (Mo)-anode tube for mammography. The gamma emitters $^{153}$Gd and $^{125}$I have been used as sources in rectilinear scanners and CT units for bone absorptometry and densitometry.

(2) Testing special filter materials for mammography (Rh, Pd, Mo), and angiography (I, Cs). Narrow bandwidth spectra require heavy filtration, resulting in severe tube heat loading since the tube voltage must be restricted. This is due to the relatively low absorption of the material for energies immediately below and well above the K-edge energy.

(3) Employing x-ray beams with distinctly different spectra. Dual energy imaging has been implemented in computed tomography and projection radiography with varying success. The high and low voltage x-ray beams require extensive calibration and image subtraction entails computer-intensive calculations.

In addition to having undesirable emission spectra, conventional x-ray tubes used in medical radiography for area or slit scanning have additional limitations which conventional filtration materials cannot mitigate:

(1) Anode materials or combinations of anode materials (composite anodes) are extremely restricted. The two most common anode materials are Mo (mammography) and W (generally radiography). A much less common anode material (a composite) is a Mo-W alloy (used for mammography). The characteristic x-ray energies of these materials are substantially different and the anode is not typically used at a voltage where the emission lines of W are prominent. Using a composite anode comprised of materials whose characteristic x-ray energies are similar is unacceptable with conventional filter materials due to the relatively high transmissing below the K-edge and the need to use a substantial thickness of filter material to minimize the higher energy emission lines which are very intense. Tube heating would be substantial.

(2) The small size of the x-ray tube focal spot (necessary to ensure adequate spatial resolution in the recorded projection image) places severe demands on the capacity of the tube to dissipate heat. Conventional W-anode tubes may have focal spots sizes of $1.5 \times 1.5$ mm while tubes used for mammography often have focal spots of $0.6$ mm $\times 0.6$ mm and sometimes less than $0.3$ mm $\times 0.3$ mm. Redistribution of the heat generated by the electron beam hitting the anode often involves rotating the anode at a high speed and possibly providing additional oil or water cooling. The permissible beam current (and thus x-ray fluence) decreases as the focal spot size decreases. The anode material has a limited ability to dissipate heat quickly in the immediate area of the focal spot. The total time a unit area of the anode is continuously bombarded by the electron beam is dependent on the rotation rate. The time between bombardments depends on the radius of the rotating anode. Enlarging the anode (while maintaining the rotation speed) increases the total heat capacity of the tube, but not the upper limit on instantaneous tube output which is related to the power handling capabilities (the melting point) of the anode material. The total fluence can be increased by increasing the focal spot size. The available fluence may be of concern if patient motion reduces image quality (that is, long image acquisition times are not acceptable). In addition, employing materials such as Ag in an anode for an application where a small focal spot is required may be questionable since the heating limitations are more severe for Ag than for Mo. A material such as Ag might be used in an anode if the focal spot could be extended to cover a larger area and the tube voltage could be increased to a higher, more efficient operating level.

(3) Beam divergence, which results in variable magnification from the center to the edge of the image and also for internal structures within an object that are different distances from the source. Maintaining an adequate distance between object and source helps to limit this effect. A slit scan system which uses a single slit for each distinct x-ray source provides a fairly constant magnification in the scan direction (which is typically perpendicular to the length of the collimating slit) while allowing the beam magnification to vary continuously from the center to edge of the image along the length of the slit.

A slit scanning system which uses a single diverging x-ray source and multiple slits must deal with the variable magnification problem. Multiple slits in a scanning unit are useful for reducing the tube heating and typically reducing scan times. Multiple slit scanning devices often maintain a fixed source, stationary patient and frequently a stationary area detector while allowing the slits to move in such a fashion as to maintain exposure uniformity (Barnes et al. *Med. Phys.* 6(3): 197, 1979; King et al. *Med. Phys.* 10(1): 4, 1983; Rudin et al. *Med. Phys.* 9(3): 385, 1982). However, variable magnification is maintained over the entire image for conventional multiple slit scanning devices. Consider, instead, scanning with a multiple slit configuration while creating relative linear motion between the source+slits and subject, and an area detector which functions as an image integrator. As with other multiple slit scan designs, the total exposure for a segment of the image represents the sum of contributions from several slits. Care must be taken so as to avoid extensive overlapping of individual slit projects which have noticeably different projection angles. This will tend to degrade image resolution in the direction of scan. Even if each slit has its own set of detectors, the final image would be comprised of a number of strip segments which were acquired at various projection angles with respect to the scanning direction. Conventional x-ray beam filtration materials (Al, Cu, etc.) will not affect the divergent nature of the focal spot (the magnification properties of the imaging system).

Conventional single and multiple slit scanning systems also encounter problems when utilized for dual energy studies. Because the tube voltage must be switched between low and high values for best results (minimal overlap of the two spectra), images must be acquired at two voltages (either line by line or entire images) to obtain acceptable data for tissue composition analysis. In addition, these dual energy scanning techniques require extensive beam calibration using a phantom comprised of many combinations of (typically) lucite and Aluminum (Macovski et al., *Comput. Biol. Med.* 6: 325 1976; Lehmann et al., *SPIE* Vol. 314: 143, 1981; Lehmann et al., *Med. Phys.* 8(51): 659, 1981). Conventional x-ray tube slit scan systems do not permit a single line to be imaged simultaneously at two distinct narrow bandwidth energies or to acquire, simultaneously, two lines at distinctly different energies of narrow bandwidth and at approximately the same projection angle with a single source. Maintaining the same projection angle for the same line acquired at two different energies is very important since dual energy "subtraction" is done by image processing of data from both images.

Slit scanning systems which utilize a radionuclide source (which includes simple projection and CT scanning) in place of an x-ray tube have been employed for tissue composition analysis application in medical radiography such as the detection of certain bone diseases (bone mineral loss). Such systems have similar restrictions:

(1) The selection of potential radiation sources is limited since many radionuclides emit several energies of x-ray and/or gamma ray which would limit energy resolution. Introducing K-edge material filters is often an unsatisfactory means of limiting the bandwidth since the choice of K-edge filters is limited, they attenuate both below and above the Kedge, and for high energy x-rays most K-edge filters would have to be very thick to provide acceptable attenuation.

(2) A scanning system employing a radionuclide source often requires a long time period to scan the patient or object. This is because radionuclide sources (as with other materials) exhibit self-absorption which has an exponential dependence on material thickness. A small focal spot source of even low intensity is difficult to produce and requires a large quantity of the radionuclide. The need for a small source size parallels the problem of x-ray tube focal spot size (maintaining adequate spatial resolution).

SUMMARY

The present invention is directed to an x-ray source and/or scanning system comprising one or more multilayer x-ray mirrors for reflecting a narrow bandwidth x-ray beam in a form which is compatible with various slit scanning system designs. In one aspect of the invention one or more multilayer mirrors are used with conventional x-ray tube or radionuclide sources to construct unique scanning systems which offer narrow bandwidth spectra of one or more energies. In another aspect of the invention systems are described which permit multiple energy imaging using a single multilayer mirror of unique design or with at least two conventional multilayer mirrors. In yet another aspect of the invention systems are described in which the x-ray tube or radionuclide focal spot source can be replaced by a line (extended focal spot) source.

Incorporation of multilayer x-ray mirrors into a radiographic scanning system (either simple projection or CT) may be advantageous because:

(1) The beam bandwidth can be made much narrower than with general (Al, Cu) or K-edge (Mo, Rh, I, Sn, Cs, Ce, etc.) attenuation filtration materials. A multilayer x-ray mirror can even be used to select between the characteristic x-ray energies emitted from a Mo-anode tube.

(2) The x-ray tube voltage can often be increased above those values that are acceptable when attenuation materials are used as filters. This increase in tube voltage results in an increase in x-ray production efficiency.

(3) Most or all attenuating filtration materials typically used with x-ray tubes can be removed. This increases the available x-ray fluence.

(4) The use of multilayer mirrors permits the source to be substantially altered.

(5) The use multilayer mirrors permits the direction of x-rays to be altered.

(6) A multilayer mirror, due to its unique energy discrimination capabilities (in comparison to K-edge filtration materials), also makes possible the construction of new x-ray tube anodes from materials whose characteristic x-ray energies are similar.

(a) Design I: $W=C=22$ Å, 30 layers + $W=C=20$ Å, 40 layers; II: $W=C=20$ Å, 30 layers + $W=C=22$ Å, 40 layers.

(b) Design III: $W=C=22$ Å, 20 layers + $W=C=10$ Å, 250 layers; IV: $W=C=10$ Å, 100 layers + $W=C$ 22 Å, 40 layers.

Figure 4:
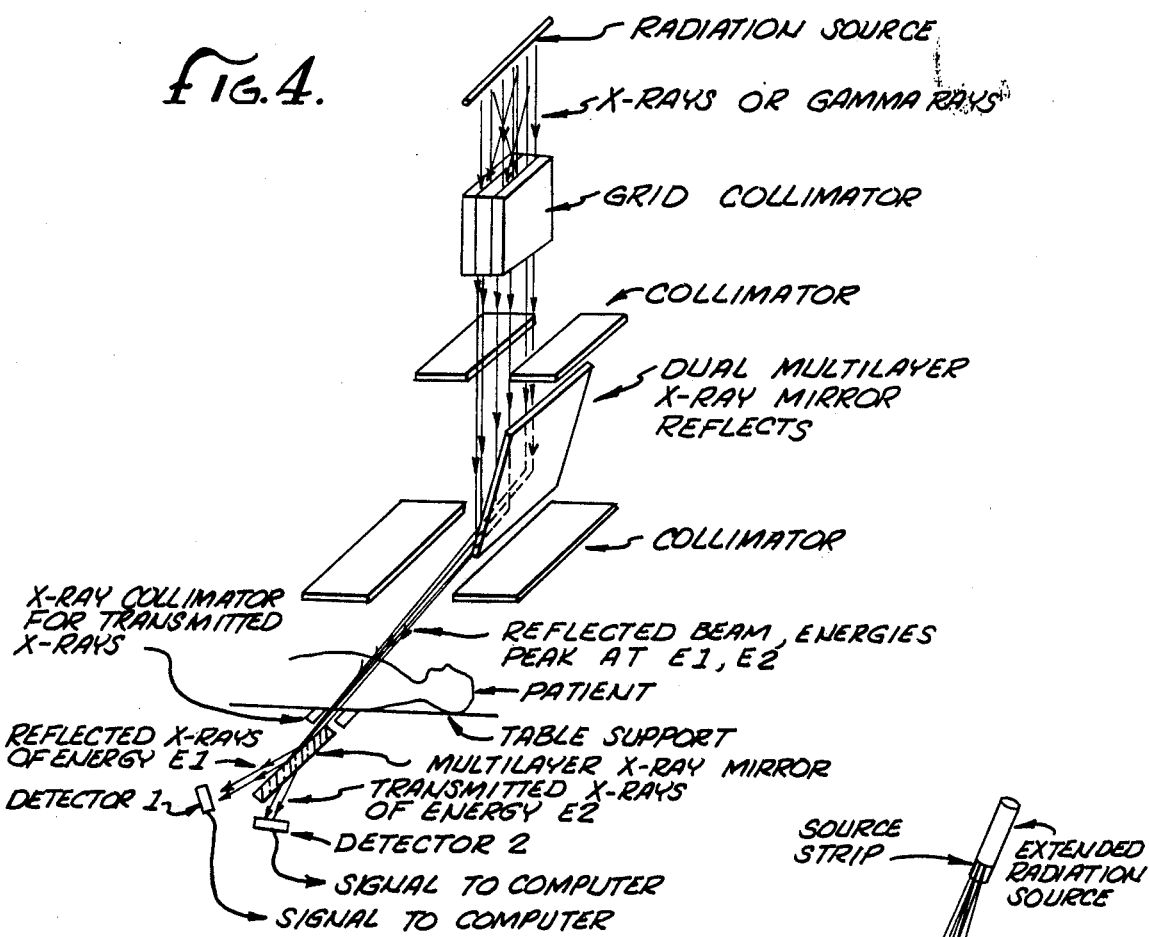

FIG. 4 is a scanning system for dual energy imaging applications which employs a dual multilayer x-ray mirror. A multilayer mirror is used to separate the transmitted x-rays of energies E1, E2 into two beams in lieu of a single detector with sufficient energy resolution to discriminate between E1, E2.

Figure 5:
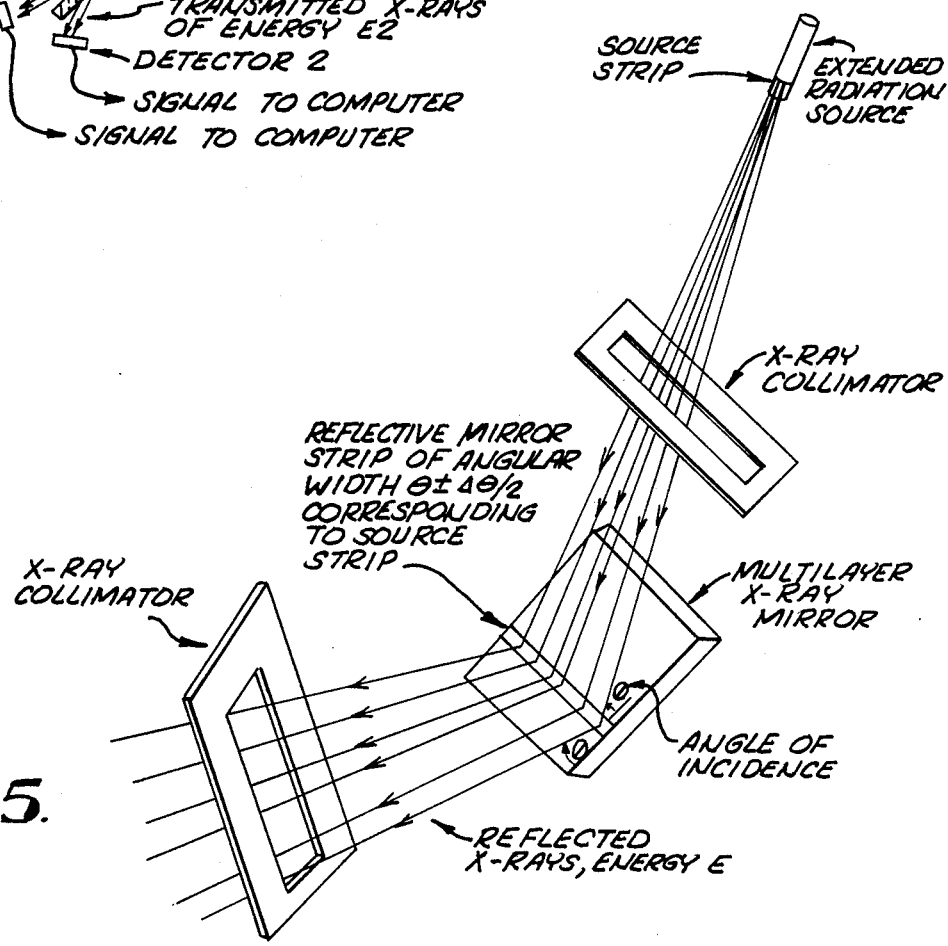

FIG. 5 demonstrates the limited angle of incidence relationship between a strip of the extended focal spot source and a strip on the multilayer x-ray mirror.

FIG. 6 shows the angular dependence of the reflectivity of a 100 layer, $W=C=16.5$ Å multilayer mirror at I) 20, II) 40 KeV and a 250 layer, $W=C=10$ Å multilayer at III) 75 KeV.

FIG. 7 are examples of various geometric shapes for radionuclides which may be used with a multilayer x-ray mirror.

Figure 8:
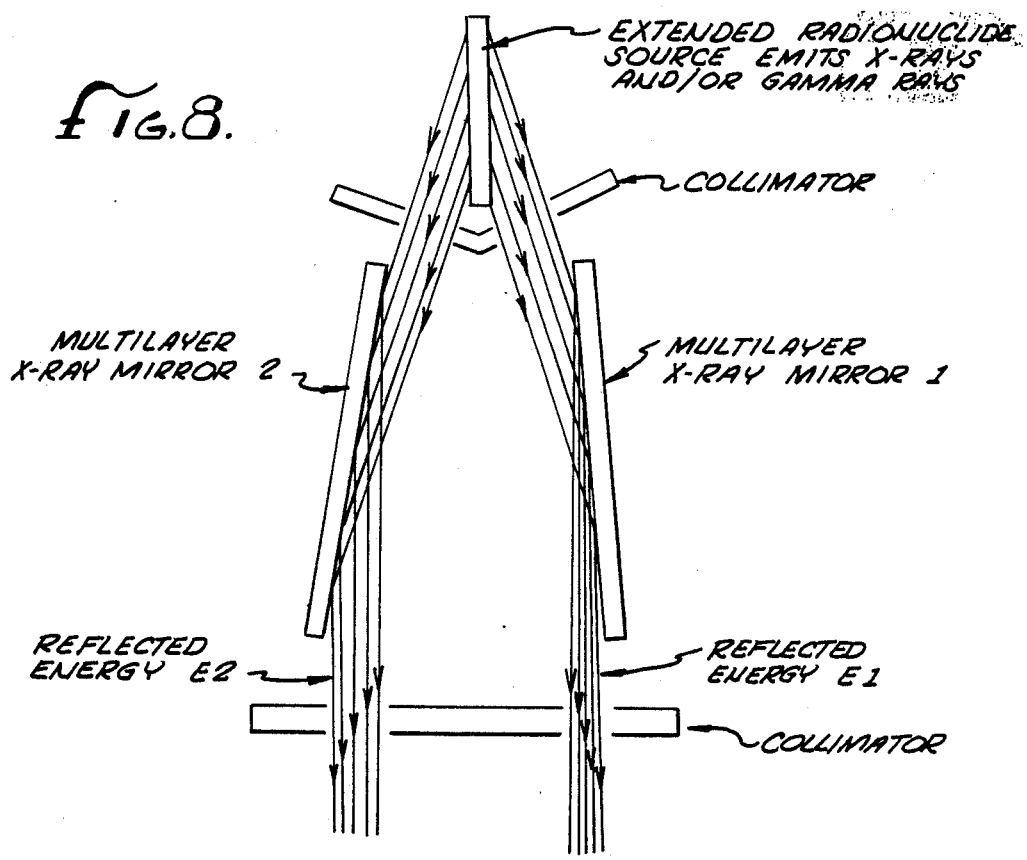

FIG. 8 shows an extended radionuclide source used with two multilayer x-ray mirrors such that both the front and back of the source are utilized.

Figure 9:
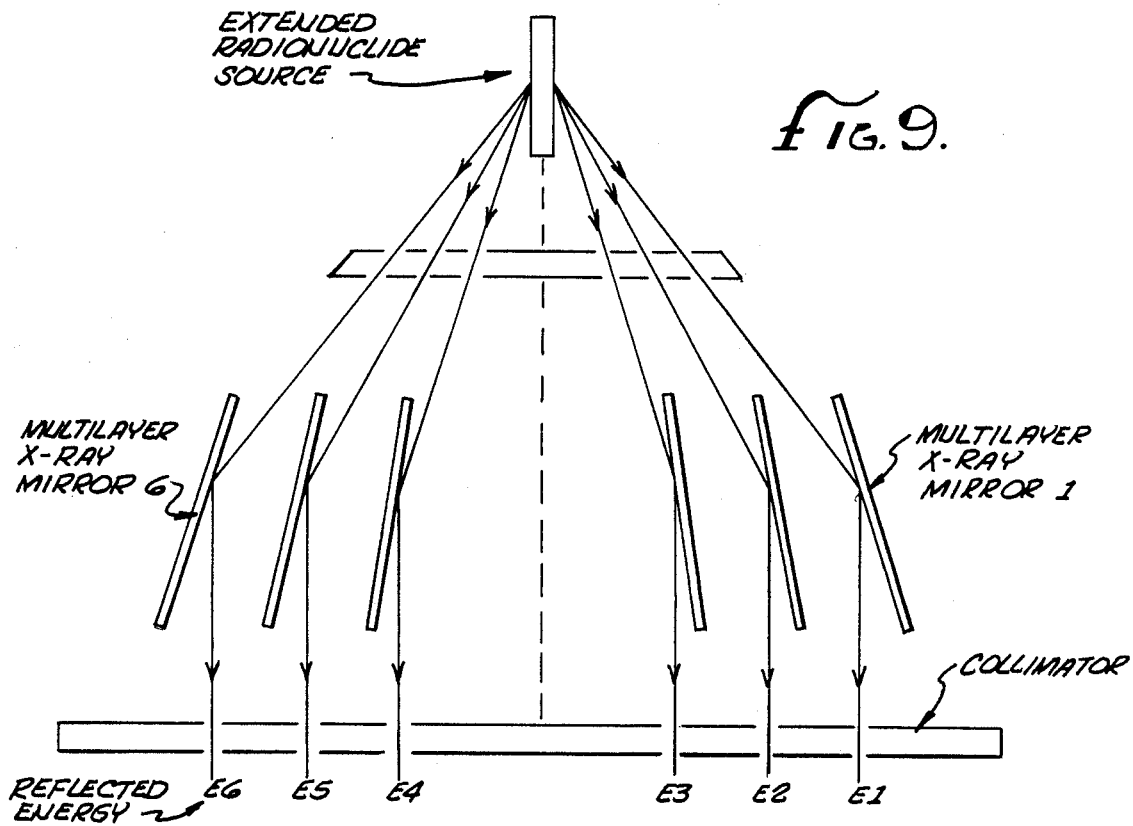

FIG. 9 shows an extended radionuclide source with multiple multilayer x-ray mirrors.

FIG. 10 is a grid collimator for use with an extended source and a multilayer mirror.

FIG. 11 is an enlarged rotating anode x-ray source and an extended focal spot which is to be used with a multilayer x-ray mirror.

Figure 12:
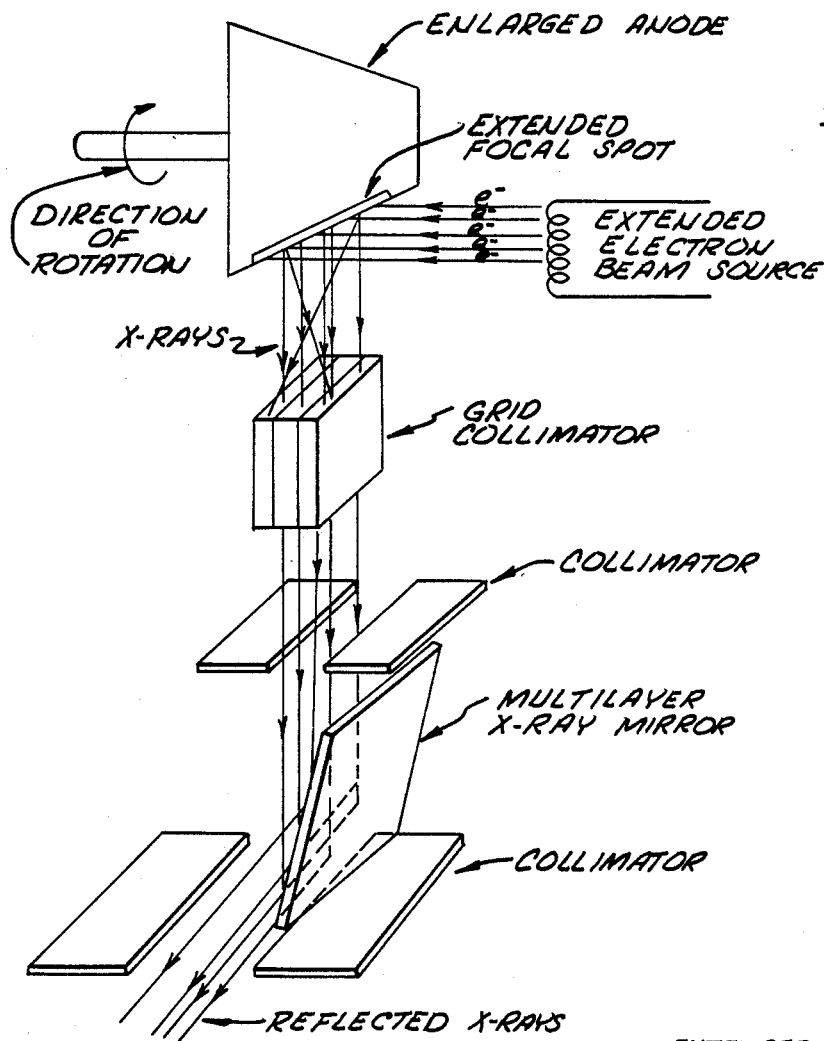

FIG. 12 shows a scanning system employing the anode of FIG. 11.

Figure 13:
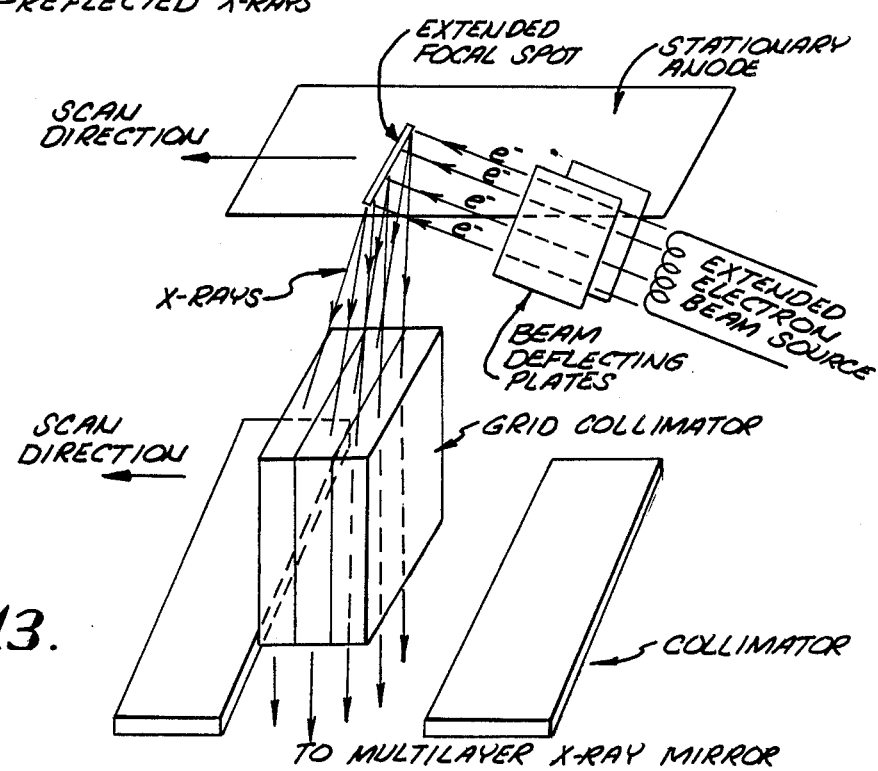

FIG. 13 is an extended focal spot scanning electron beam x-ray source with a stationary anode.

Figure 14:
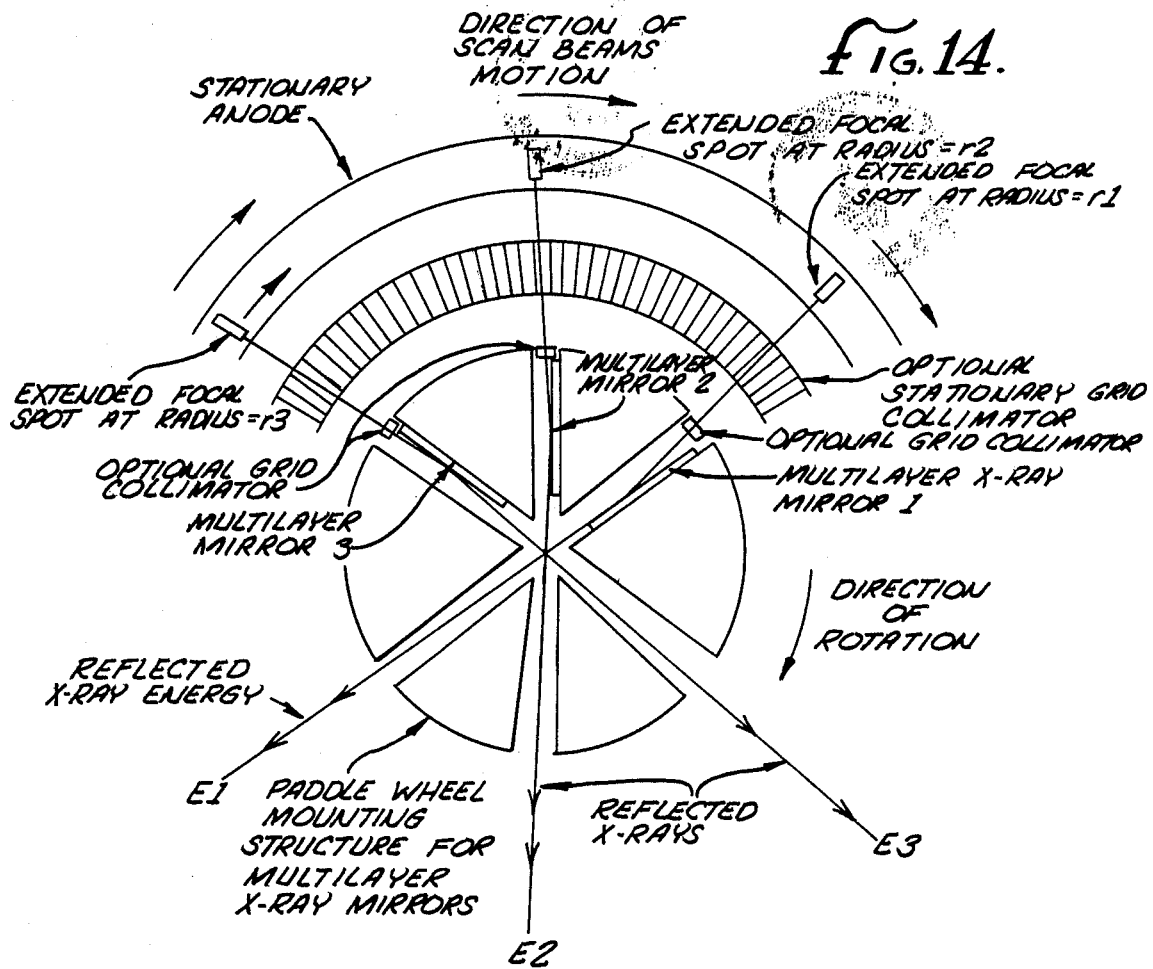

FIG. 14 is a variation of FIG. 13 in which several electron beams trace the arcs of one or more circles. The multilayer mirrors are mounted in a paddle wheel structure which rotates in synchrony with the scanning electron beams.

FIG. 15: (a) A composite rotating anode x-ray tube for low energy xray imaging made from alternating strips of Mo and Ag and a single extended electron beam, (b) A composite rotating anode x-ray tube made from separate strips of Mo and Ag, each with its own extended electron beam.

Figure 16:
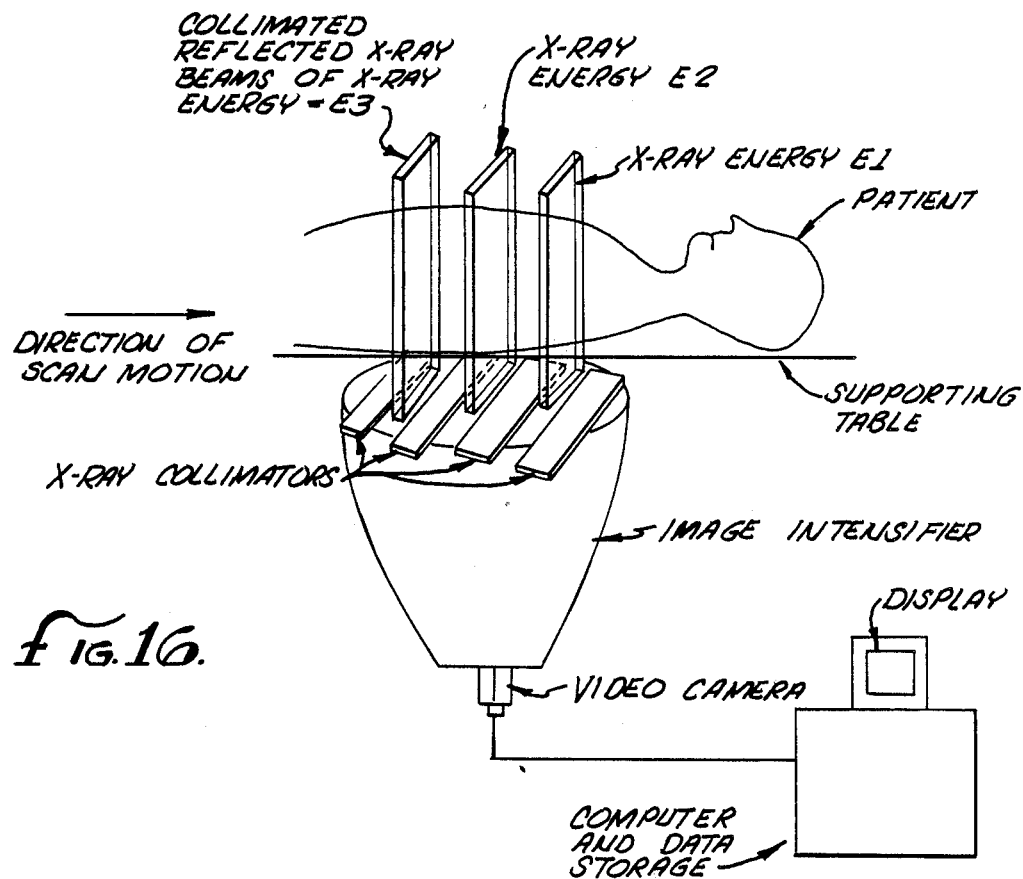

FIG. 16 is an image intensifier which can be used as an area integrator (video camera readout once during entire scan) or as a discrete detector capable of recording several different beams of different spatial location simultaneously. Camera signal is digitized and stored by a computer with video display capability.

DETAILED DESCRIPTION OF PREFERRED EMBODIMENTS

Figure 1:
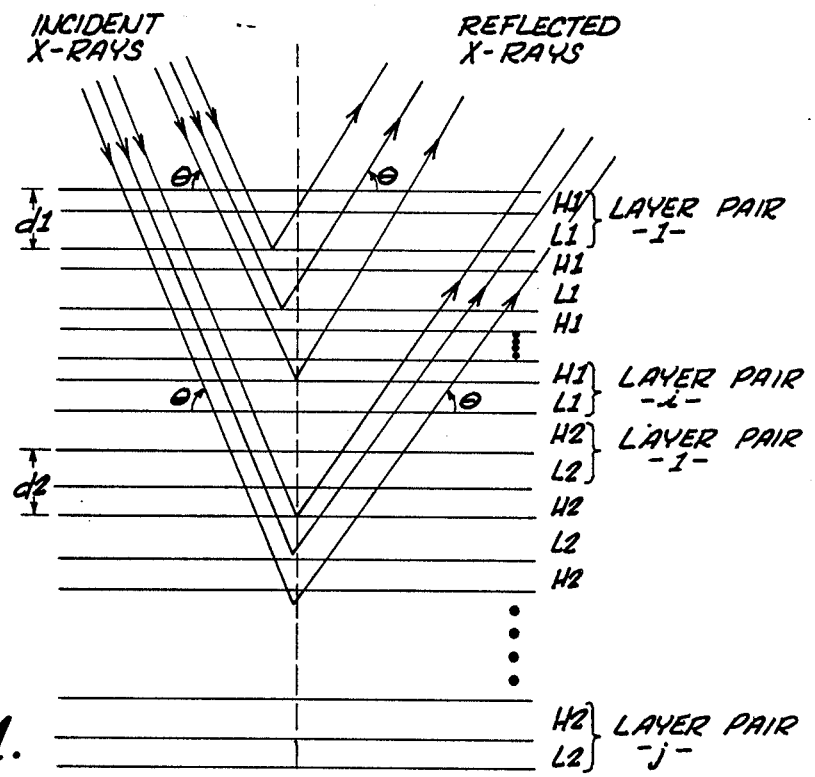
FIG. 1 is a schematic of a dual multilayer x-ray mirror which is comprised of a dual multilayer x-ray structure in accordance with one embodiment of the invention.

Multilayer mirror designs have been investigated for dual energy imaging applications in projection radiography. These designs will be referred to as "dual multilayers". Dual multilayers x-ray mirrors can be prepared using conventional deposition techniques such as vapor, sputtering, etc., which are also employed to manufacture conventional multilayer x-ray structures. A dual multilayer as shown in FIG. 1 consists of two distinct multilayer structures deposited on a substrate formed of any suitable material such as polished silicon, float glass, mica, etc. The substrate may be of a variety of geometric shapes. The multilayer structures are formed of alternating layers of high and low atomic number materials which have thicknesses denoted by H and L, respectively. A layer pair is comprised of two layers which are the high and low atomic number materials. A layer pair has a thickness $d=H+L$ which is frequently called the period of a multilayer structure. The two distinct multilayer structures used to form a dual multilayer structure may have constant periods d1, d2 or variable periods. A multilayer structure may have a variable period which is the same over the area of the mirror or which changes with position along the length of the mirror (graded-thickness multilayer). An upper multilayer structure 1 has a layer pair spacing d1=H1+L1 and is comprised of i (an integer) layer pairs. Similarly, a lower multilayer structure 2 has a layer pair spacing d2=H2+ L2 and j (an integer) layer pairs. H1, H2 (and L1, L2) may represent thicknesses of different materials. The choice of materials for H1, L1, H2, L2 will effect the reflectivity bandwidths of the two multilayer structures.

Figure 3A:
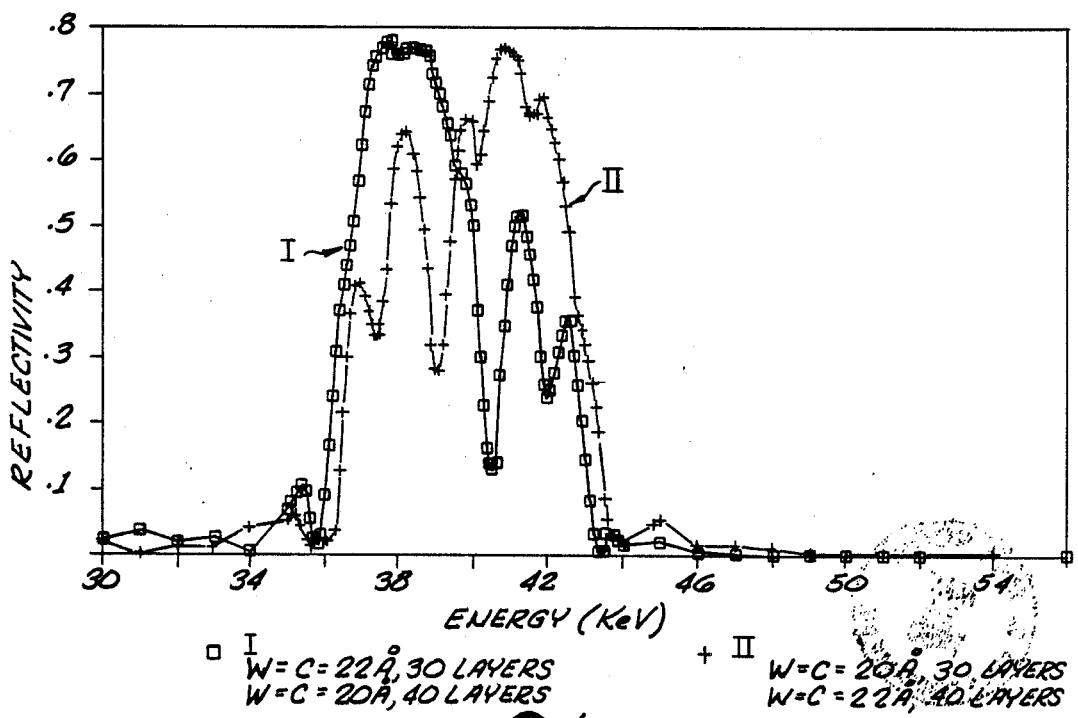
FIG. 3 shows theoretical reflectivity curves as a function of energy for various dual multilayer mirror designs at a particular angle of incidence ($\theta = 0.23°$). Design I may be preferred over II. Design III is highly preferred over IV.
Figure 3B:
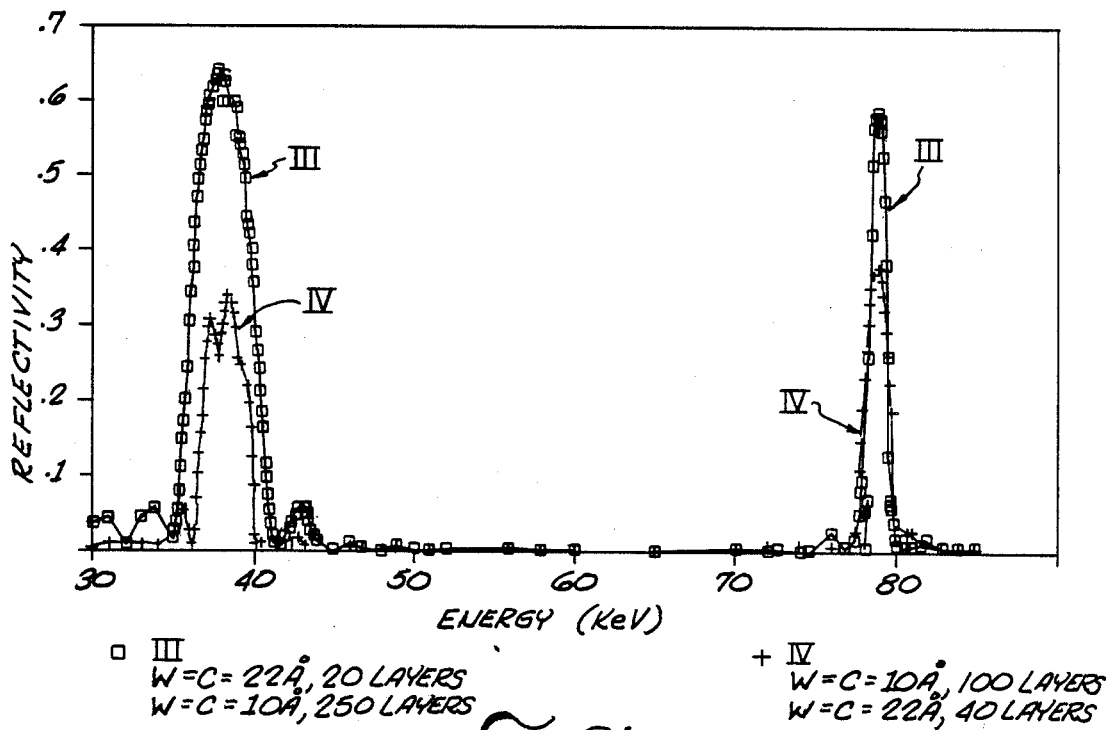

The layer pair spacings d1, d2 will determine the energies E1, E2 of the first order reflectivity peaks of multilayers 1 and 2 for a given angle of incidence $\theta$ (see FIG. 3). The number of layer pairs i, j which comprise the two multilayers are chosen such that:

(a) Each multilayer structure approximately maintains its high reflectivity characteristics R1, R2 (typically greater than 40% at E1 and E2) with only limited interference from the other multilayer structure. This involves restricting the number of layer pairs —i— such that R1 (the reflectivity at energy peak E1) is barely attained while limiting the attenuation from multilayer 1 for energy E2. For multilayers used as x-ray reflectors over the energy range 10-100 KeV, the reflectivity increases rapidly when adding layer pairs and the number of layer pairs is relatively small. Increases in reflectivity will begin to diminish and eventually approach zero, despite adding additional layer pairs, since the multilayer materials also absorb x-rays.

(b) As the energy difference between E1 and E2 increases, it becomes more desirable to have the multilayer structure which is primarily responsible for reflecting the lowest energy to be the upper multilayer structure. This will be the multilayer structure with the largest layer pair spacing. If the materials of the two multilayer structures are the same or very similar, then the upper multilayer structure will require fewer layers than the bottom multilayer structure to attain a high peak reflectivity.

(c) The reflectivity R2, primarily due to the lower multilayer structure, will typically be larger when the top multilayer structure has a layer pair spacing which is more like a Bragg crystal (H1<<L1) than a quarter wave stack (H1=L1).

(d) If E1 and E2 are substantially different and it is desirable to limit the reflective bandwidth at E1, then:

(i) a K-edge material filter, whose K-edge energy is somewhat larger than E1 may be inserted into the beam.

(ii) the upper multilayer structure may use a high atomic number material which is less than that of the lower multilayer structure. Thus, a material such as W could be replaced by a material such as Mo or Fe. If it is preferable to limit the reflectivity bandwidth at E2, then the high atomic number material H of multilayer structure 2 must be reduced.

Figure 2:
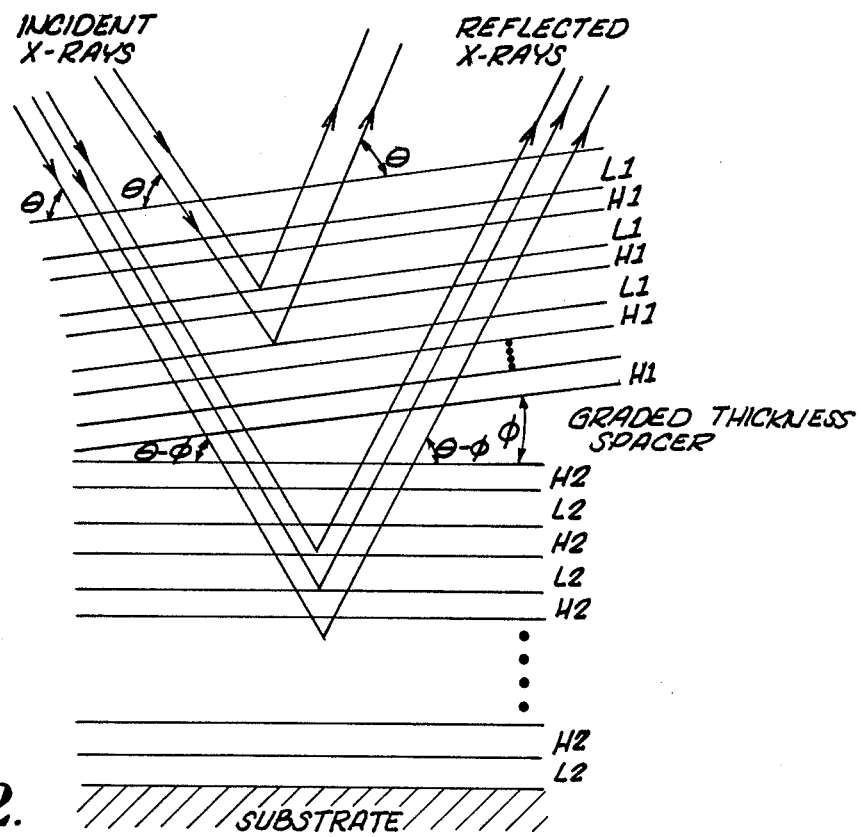
FIG. 2 is a variation of the dual multilayer x-ray mirror structure shown in FIG. 1 wherein a weakly absorbing material of graded-thickness is included between the two distinct multilayer x-ray structures.

With reference to FIG. 2, a spacer material exhibiting weak x-ray absorption, such as Carbon or Boron, is deposited immediately on the upper surface of the bottom multilayer structure of —j— layer pairs. This spacer material has a graded layer thickness which creates a tilt angle $\Phi$ between the upper surface of the spacer material and the upper surface of the bottom multi-layer structure. The top multilayer structure of —i— layer pairs is then deposited on the spacer material. For an angle of incidence $\theta$, the first order reflectivity maxima at energies E1 and E2 occur at angles which are approximately $\theta$ and $\theta-\Phi$, respectively.

FIG. 2 shows the spacer with its narrowest end nearest to the source of radiation. If the spacer is altered such that the thickest end is nearest the source, then E1 occurs at $\theta$ and E2 occurs at $\theta+\phi$. The reflectively maxima E1, E2 can be separated spatially and thus recorded by two separate detectors. If a dual multilayer x-ray mirror of the type shown in FIG. 2 is used with a source, then, the transmission data is at different projection angles for E1 and E2. This dual multilayer mirror with spacer could be used to separate the x-ray energies E1 and E2 present in a transmitted beam which was generated by a dual mirror of the type shown in FIG. 1.

For the case of FIG. 1, the layer pair order may be reversed from H, L to L, H for the top and bottom multilayer structures. For the case of FIG. 2 it may be somewhat preferable to select the order such that H1 and H2 will border the spacer material (as shown).

With reference to FIG. 4, a dual multilayer x-ray mirror as seen in FIG. 1 reflects a slit-like beam of x-rays or gamma rays emitted from a source. The reflected beam spectrum is dominated by two energies E1 and E2. A means of collimating the radiation immediately before and after reflection from the multilayer x-ray mirror is provided. A K-edge filter material (not shown) may be inserted between the source and dual multilayer mirror in order to limit the bandwidth of the lowest energy reflectivity maxima. The reflected x-ray or gamma ray beam is incident on and partially transmitted by the object. A collimator is provided after the object as a means of scatter reduction. The detector means may consist of: (1) an atray of detectors with sufficient energy resolution to differentiate between transmitted energies E1, E2; (2) a multilayer mirror to separate the two energies E1, E2 into two beams which are directed to separate arrays of detectors.

The detector data is collected and analyzed by a computer for display and storage.

The dual mirror design offers several advantages over conventional multilayer structures for radiographic imaging or material composition analysis:

(a) Simultaneous image acquisition (no position errors) at energies slightly above and below the K-edge of a material such as Iodine which is used in angiography. This is a convenient method for doing K-edge dual energy subtraction. A detector with good energy resolution characteristics is needed to separate the transmitted energy peaks at E1 and E2.

(b) The dual multilayer mirror may be used as in "(a)", and we now consider the condition E1 near E2 as a method of increasing the overall reflectivity bandwidth above that of a single mirror.

(c) As a means of producing two distinctly different energies (E2>>E1) for dual energy material composition analysis such as could be useful for estimating bone mineral loss (osteoporosis) or the presence of calcium in a lesion. When E1 and E2 are substantially different, the relative transmission will also differ significantly. Depending on the optimal ratio of E1 photon count for the desired dual energy signal-to-noise ratio with minimal patient (or object) dose (total absorbed energy), it may be desirable to limit the bandwidth of the E1 peak or the E2 peak.

The use of a dual multilayer x-ray mirror for dual energy radiography minimizes the problem of patient or object motion for each projection slice acquired (assuming discrete image slices, as is done in CT or digital slit scan projection radiography, are taken). The problem of alignment of image data acquired at different times (and perhaps different projection angles) does not arise. The tube voltage need not be switched between low and high kVp values to generate acceptably different spectra. The dual multilayer x-ray mirror can be used effectively for dual energy tissue (material) composition analysis if:

(1) The x-ray detector has sufficient energy resolution to differentiate between E1 and E2.

(2) The x-ray detector is a combination of two detectors such that the top detector (which intercepts the transmitted x-rays first) is highly attenuating at one energy but very transmissive at the other energy.

(3) A second multilayer x-ray mirror is aligned with the reflected x-ray beam from the dual multilayer x-ray mirror. The low energy (E1) x-rays would be largely reflected to a set of detectors. The high energy (E2) x-rays would be largely transmitted through this second mirror and intercepted by a different set of detectors. If contamination problems in the high energy x-ray beam transmitted through the second mirror arise, yet a third multilayer x-ray mirror can be inserted after the second multilayer mirror to reflect the high energy component (E2) to a second set of detectors.

(4) The second multilayer x-ray mirror in "(3)" is a dual multilayer mirror with a spacer material of graded thickness (see FIG. 2).

The dual mirror design differs from conventional multilayer designs in its ability to enhance the reflectivity bandwidth of a single multilayer or provide two distinct first order reflectivity peaks without introducing additional resonance reflectivity peaks. This dual mirror design attempts to minimize interactions of the top multilayer and the reflectivity peak of the bottom multilayer while still providing high reflectivity at both peaks.

The primary utility of a dual multilayer mirror is likely to be in the moderate x-ray energy region (10-100 keV) for medical and industrial applications where the subject totally attenuates XUV and soft x-rays (10 keV). For dual energy applications two separate mirrors are not required and the mirror tilt (and thus detector position) need not be changed. As a means of increasing the reflectivity bandwidth, a dual mirror design represents an alternative to increasing the layer pair spacing (and thus decreasing the angle of incidence $\theta$).

FIGS. 5-10 represent a second embodiment of the present invention wherein the use of a radionuclide source in a scanning system is enhanced. Turning to FIG. 5, an extended radionuclide source is shown. This radionuclide source design represents a fundamentally different approach from conventional focal spot source designs. The effects of self attenuation are mitigated by redistributing the radionuclide source material over a greater area. The multilayer has a narrow angular bandwidth ($\theta \pm \theta/2$) at a particular energy. For a collimated beam incident on the mirror at an angle $\theta$, there is an approximate 1:1 correspondence between a narrow strip on the focal spot and a strip on the multilayer mirror which ensures high reflection efficiency at energy E (see FIGS. 5, 6). Additional collimation can be inserted after x-ray reflection from the mirror to further improve this energy selectivity.

As shown on FIG. 7, the elongated radionuclide source (focal line) may include a variety of geometric shapes (bar, wedge, parabolic, etc.), some of which partially compensate for intensity decrease with position along the elongated source. Additional increases in efficiency are gained by placing multilayer mirrors on both sides of a single extended source (FIG. 8). Collimation is provided prior to and after reflection from the multilayer mirrors. Collimation may be of the grid-type as shown in FIG. 10. The reflected beams from the two multilayers may be of the same or different energies (E1, E2). It is highly preferred that the two reflected beams be approximately parallel so as to minimize differences in the projection path length for the same scanned area of the object. The radiation beams transmitted by the object are collimated to reduce transmitted scattered radiation. If the energies E1, E2 are the same, an area detector such as an image intensifier or film may be used to integrate the transmitted fluence due to both beams. Alternatively, separate detector arrays may be employed to record the two transmitted beams independent of how the energies E1, E2 are related. The object may be scanned by implementing a means of relative linear motion between the source-detector unit and the patient. Thus, the patient may be moved in a linear fashion through the stationary source-detector device or vice versa. Image data can be transferred to a computer for analysis, display, and storage.

FIG. 9 shows an modification of FIG. 8 wherein more than two multilayer mirrors are employed with the extended source in order to increase the efficiency of the system while reducing image acquisition time. The reflected beams are approximately parallel and a variety of discrete detector arrays or continuous detectors may be used, depending on the relationship amongst the reflectivity peak energies.

If the extended source is very long, it may be desirable to limit the field of view of a given area of the multilayer x-ray mirror by incorporating a grid collimator before and/or after the multilayer to further restrict possible angles of incidence (FIG. 10). The collimator may be made of thin parallel strips of a x-ray opaque material such of lead with a relatively x-ray transparent spacer material if used with a planar multilayer mirror. An X-Y grid collimator could also be employed. A multilayer of graded layer thickness or a multilayer on a curved substrate could be used with a focused grid collimator. The grid collimator may be oscillated to avoid creating grid lines in the image. The use of grid collimators is widespread in x-ray radiography. However, these grid collimators are used between the patient and detector, not the source and the patient. The grid collimator can be used between the source and multilayer mirror and/or between the multilayer mirror and object in our extended source design.

FIGS. 11-16 represent a third embodiment of the present invention wherein an enlarged anode, extended x-ray source is provided. With reference to FIGS. 11 and 12, a x-ray source such as a x-ray tube with an extended focal spot and enlarged rotating anode provides x-rays which are efficiently reflected within a narrow energy bandwidth. An extended focal spot permits the use of a longer multilayer x-ray mirror and so increases the available x-ray fluences in comparison to a conventional x-ray tube. Conventional or grid collimators are provided immediately before and after the multilayer x-ray mirror. The multilayer x-ray mirror may be tilted so as to shift the reflectivity energy maximum. Multiple mirrors can be used with a single x-ray tube source. As with a radionuclide source and multiple mirrors, the mirrors may be adjusted such that more than one energy is available for scanning at any instant. If conventional multilayer x-ray mirrors are utilized, separate detectors must be provided for the various energies since the reflected beams are spatially separated from each other. The x-ray tube voltage need not be switched in order for two sets of projects at different energies (dual energy acquisition) but approximately the same projection angle to be acquired simultaneously.

FIG. 13 shows a collimator used with a stationary anode and an extended scanning electron beam. The extended electron beam creates an extended focal spot source. This extended focal spot or "line" source permits a longer multilayer x-ray mirror to be employed. The electron beam is scanned in a linear fashion along a straight path at a fixed height. The multilayer x-ray mirror, collimator, and detection means must move in synchrony with the scanning electron beam. The detector may remain stationary if it is used to integrate the fluence over the scanned object. Such a detector could be a film- screen unit or an area image intensifier.

In contrast to FIG. 13, FIG. 14 shows the extended electron beam as being scanned simultaneously along arcs of not necessarily equal radius. The use of several scanning electron beams can increase the available instantaneous x-ray fluence at a single energy or permit several energies to scan different regions of the object simultaneously. In FIG. 14, multiple multilayer x-ray mirrors with collimation are mounted in the arms of a paddle wheel-like device which provides a means of scanning the object by simple rotation of the paddle wheel. The scanning electron beams move in synchrony with the corresponding multilayer x-ray mirrors. Collimators to reduce transmitted x-ray scatter are located between the object and the detector or detectors. If the reflected energies are the same, an area detector such as film-screen or an image intensifier may be used. Alternatively, discrete detector arrays which move in synchrony with the sources may be employed. An area image intensifier could also be used in this fashion to acquire several image strips simultaneously.

The energy resolution characteristics and limited angular acceptance permit not only the design of x-ray tubes with larger anodes and extended focal spot sources, but also the use of different anode materials and the construction of new composite anodes. The excellent energy resolution qualities of the reflecting multilayer x-ray mirror permit the selective reflection of one characteristic x-ray energy while rejecting the other. In addition, the x-ray production efficiency of the anode material can be increased above conventional levels since the anode voltage can be increased significantly in comparison to the limited voltages which can be used with conventional or K-edge attenuating material filters.

Figure 15A:
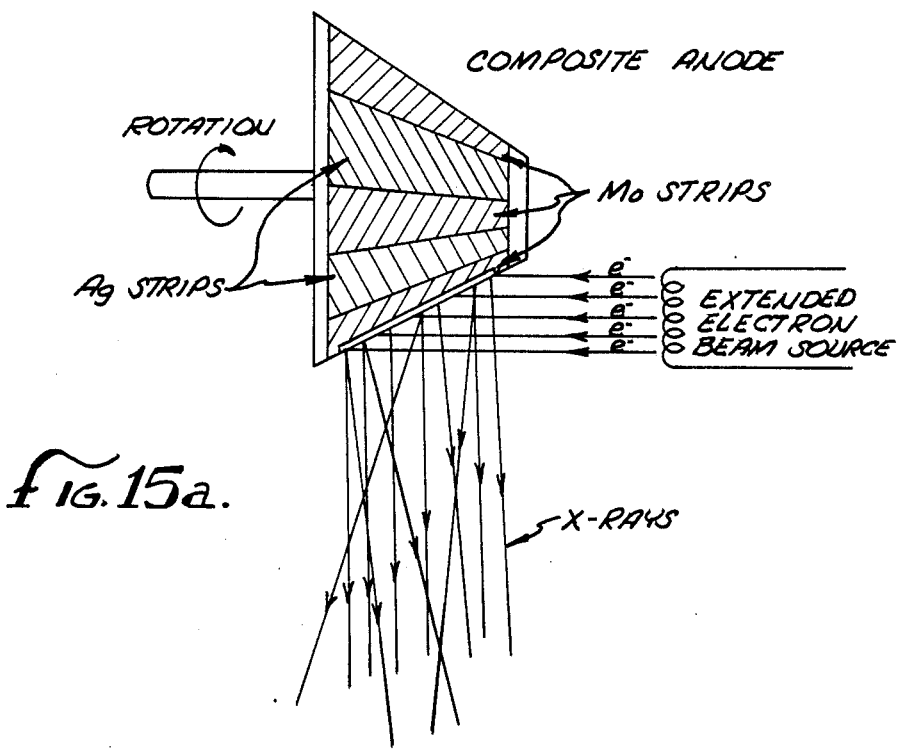
Figure 15B:
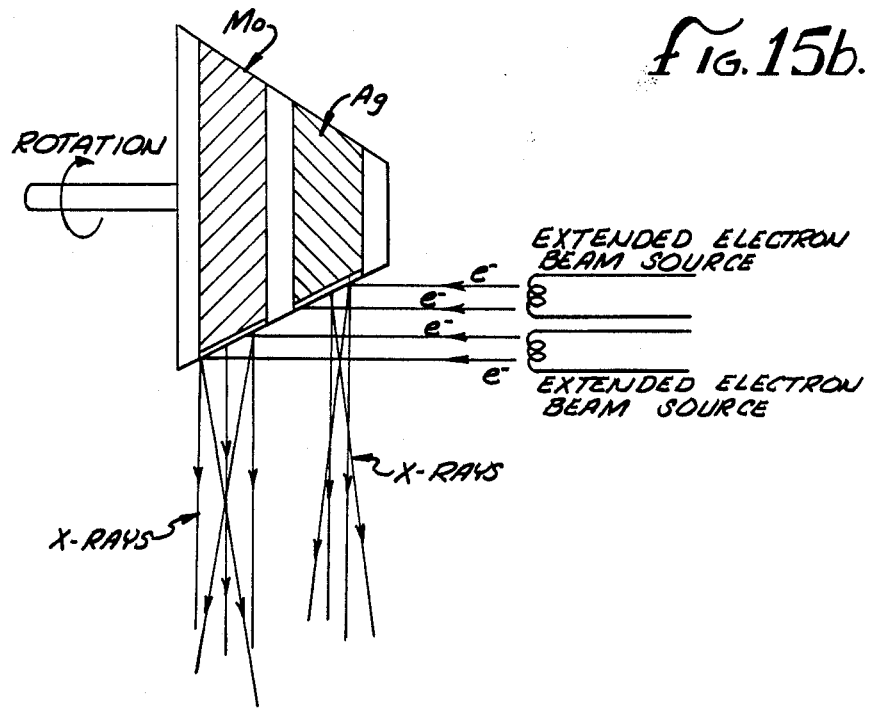

It has been shown by the inventors that the optimal imaging energy for mammography depends on breast thickness and tissue composition. As breast thickness and density increase, the optimal energy increases. It can vary from about 15–26 KeV. Since the characteristic emission lines from Mo- and Aganode x-ray tubes are very intense, it would be desirable to incorporate both materials into a single anode and to use a multilayer to select the desired emission line (for Mo: K $\alpha$, K $\beta$ = 17.8, 19.7 KeV and for Ag: K $\beta$, K $\beta$ = 22, 25 KeV). FIGS. 15a, 15b, show two possible composite rotating anode designs. FIG. 15a shows a stationary focal spot and multilayer mirror. An extended electron beam is utilized. Alternating strips of Mo and Ag are distributed about the circumference of the anode. In this design, only the relative mirror tilt angle must be shifted to select between the various emission lines. Unless the bandwidth of the mirror is made quite large, generally three of the four emission lines are rejected. FIG. 15b shows the use of two separate continuous strips of Mo and Ag. The multilayer mirror is only required to reject a single emission line. Two separate electron beam sources (elongated) are incorporated into the tube design or alternatively deflecting plates must be included to refocus from one strip to the other. The set of multilayer mirrors and collimators must be translated relative to the extend focal spot source when the other source is selected. The tilt angle will also be adjusted in order to select a new characteristic x-ray energy. Collimators are included after the object (such as a breast) so as to limit detection of transmitted scattered x-rays. As shown in FIG. 16, continuous area detector such as film-screen or image intensifier or discrete detector arrays such as screens coupled to CCDs may be used to record the x-ray image. A computer system may be used to analyze, display and store data.

While what has been hereinbefore described represents preferred embodiments of the present invention, it will be recognized that other variations would be possible, and the invention is not to be limited except as set forth in the claims appended hereto.

What is claimed is:

1. A dual energy slit scanning system for scanning an object comprising:

an x-ray or gamma ray source, said source having an emission spectrum which includes energies $E_1$ and $E_2$, $E_1$ being lower than energy $E_2$;

a dual multilayer reflector positioned to receive radiation generated by said source before passage through the object and configured to produce well defined reflectivity peaks at energies $E_1$ and $E_2$;

means for detecting said radiation following passage through the object to be scanned;

beam collimation means disposed between said source and said radiation detecting means; and means for uniformly moving either the scanned object through the radiation generated by said source or for uniformly moving said source, said reflector and said detecting means past the scanned object.

2. The scanning system set forth in claim 1 further comprising a second multilayer reflector configured to reflect radiation of energy $E_1$ while transmitting radiation of energy $E_2$, and wherein said detecting means comprise a pair of detectors, said second reflector being positioned to receive radiation from the first multilayer reflector and to reflect radiation of energy $E_1$ to one of said detectors while permitting radiation of energy $E_2$ to pass to the other of said detectors.

3. The scanning system set forth in claim 1 further comprising a second dual multilayer reflector having a laterally graded thickness spacer therein, said second reflector being positioned to receive radiation from the first reflector and to reflect radiation of energies $E_1$ and $E_2$ to said detecting means.

* * * * *